G. O. Sanderson,
Cake-Cutter.
N° 78,137. Patented May 19, 1868.
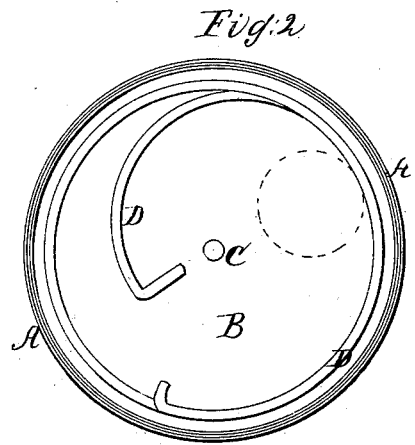
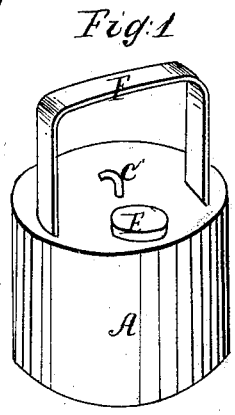
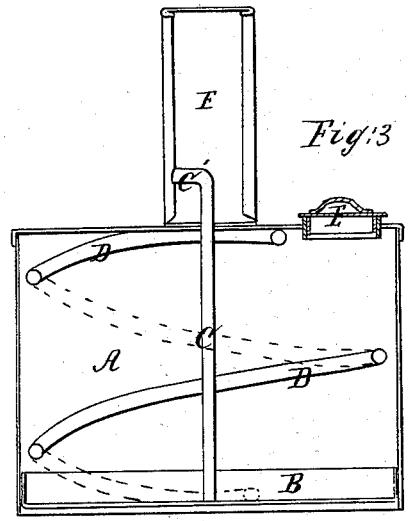
Witnesses
A. Hun Berry
Frank G. Parker.
Inventor
Geo. O. Sanderson

United States Patent Office.

GEORGE O. SANDERSON, OF BOSTON, ASSIGNOR TO HIMSELF AND FREDERICK M. BAKER, OF SOUTH READING, MASSACHUSETTS.

Letters Patent No. 78,137, dated May 19, 1868.

IMPROVED CAKE-CUTTER.

*The Schedule referred to in these Letters Patent and making part of the same.*

TO ALL WHOM IT MAY CONCERN:

Be it known that I, GEORGE O. SANDERSON, of Boston, in the county of Suffolk, and State of Massachusetts, have invented certain new and useful Improvements in Biscuit or Cake-Cutters; and I do hereby declare that the following is a full and exact description thereof, reference being had to the accompanying drawings, and to the letters of reference marked thereon.

To enable others skilled in the art to make and use my invention, I will proceed to describe its nature, construction, and use.

The nature of my invention consists in combining, with a biscuit-cutter, a spring-plunger and a dredging-device.

Drawings.

Figure 1 is a perspective view of my invention.

Figure 2 is a horizontal section.

Figure 3 is a vertical section.

A represents a biscuit-cutter, which may be made in any desired style, and provided with a handle, F. Within the cylindrical part, A, I place a disk, B, figs. 2 and 3, said disk having a steadying-pin or stem, C, and is pressed upon by the spring D, so that, when the biscuit-cutter is pressed into the soft dough, the disk D is pushed back toward the upper part of the cutter, where it remains until the pressure is removed from the cutter, then the action of the spring will withdraw the cutter from the dough, leaving the biscuit on the cake-board. In case it is desired to lift the biscuit from the cake-board, the disk B may be held up by the crooked end C' of the stem or steadying-pin C, until the cutter and enclosed biscuit are in the desired place of deposit; then, by allowing the spring to work, that is, by releasing the hold on C', the biscuit will be forced out by the disk B.

E is an opening, having a tight-fitting cover, through which flour may be put into the cylinder A, whence it may be shaken or dredged through the space between the loosely-fitting disk B, and the walls of the cylinder A. By this means the cutter may be kept constantly dusted or dredged with flour, so that it will not stick to the dough.

Having thus described my invention, I will now proceed to set forth my claim.

What I claim as my invention, and desire to secure by Letters Patent, is—

In a biscuit-cutter, the combination and arrangement of the disk B, spring D, and stem C C', substantially as described and for the purpose set forth.

GEO. O. SANDERSON.

Witnesses:
   A. HUN BERRY,
   FRANK G. PARKER.